Feb. 6, 1923.	1,444,735.
A. DUBUC ET AL.
LIGHT DIFFUSING CURTAIN.
FILED JAN. 11, 1921.
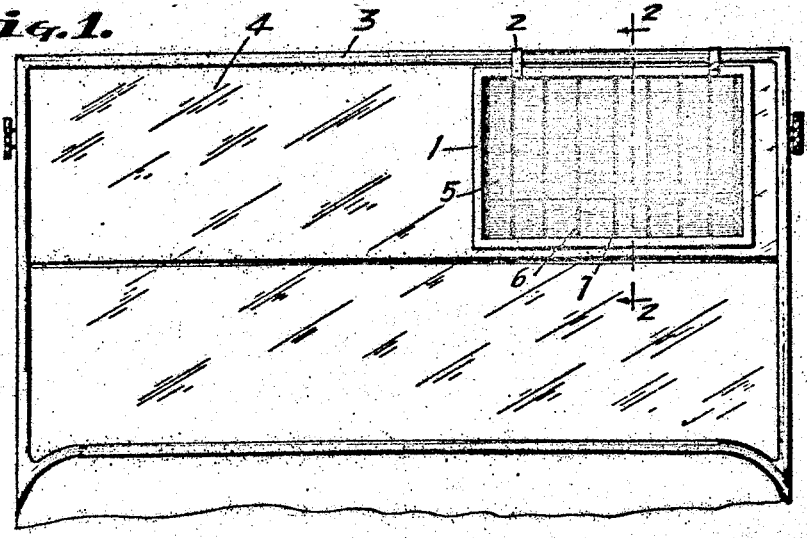
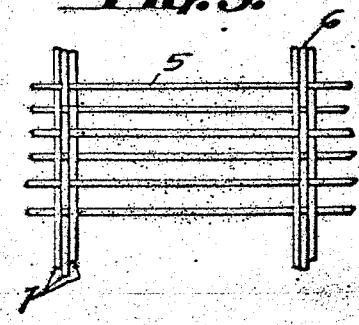
INVENTORS
Antonin Dubuc &
Antione Carricaburu.
by Hazard & Miller
ATTYS.

Patented Feb. 6, 1923.

UNITED STATES PATENT OFFICE.

ANTONIN DUBUC AND ANTOINE CARRICABURU, OF RIVERSIDE, CALIFORNIA, ASSIGNORS TO JOSEPH A. GREENE AND WILLIAM E. DEDMOND, BOTH OF LOS ANGELES, CALIFORNIA.

LIGHT-DIFFUSING CURTAIN.

Application filed January 11, 1921. Serial No. 436,511.

*To all whom it may concern:*

Be it known that we, ANTONIN DUBUC, a citizen of Canada, and ANTOINE CARRICABURU, a citizen of France, residing at Riverside, in the county of Riverside and State of California, have invented new and useful Improvements in Light-Diffusing Curtains, of which the following is a specification.

This invention is a light diffusing curtain particularly adapted to be employed in connection with a vehicle in order to prevent glare of lights reaching the eyes of the driver of the vehicle. In the embodiment of the invention illustrated in the drawings, I have shown the curtain mounted upon the windshield of an automobile, although it will be obvious that the invention is capable of other uses, and may be mounted in any suitable manner.

Devices of this character have been constructed heretofore in which a wire mesh is arranged to diffuse light by reflecting the rays of light from the crossed wires forming the mesh of the screen. Such devices have been found impractical however, since the crossed wires diffuse the light up and down, and also crosswise, and the rays of light which are thus transversely diffused are in alinement with the eyes of the person looking through the curtain. As a result the rays of light thus transversely diffused have a blinding tendency, and the result to be obtained by the light diffusing curtain is as a consequence only partially accomplished.

In the present invention we have provided a light diffusing curtain consisting of transversely arranged and longitudinally spaced light diffusing members, so that the rays of light are diffused up and down only. By this arrangement none of the diffused light is in alinement with the line of vision of the person looking through the curtain, and as a result the blinding tendency of light passing through the curtain is entirely eliminated.

In the practical embodiment of the invention, the transversely arranged light diffusing members are shown as wires which are held in longitudinally spaced relation by suitable longitudinally extending wires. These spacing wires are so spaced from one another as to not form light diffusing means which would diffuse rays of light in alinement with the line of vision, but are so arranged however, as to provide adequate supporting and spacing means for the transverse wires.

The invention will be readily understood from the following description of the accompanying drawings, in which:

Figure 1 is a front elevation of an automobile windshield having the improved light diffusing curtain mounted thereon.

Fig. 2 is a transverse section on the line 2—2 of Fig. 1.

Fig. 3 is a detail elevation of a portion of the curtain.

The curtain is illustrated as mounted in a suitable frame 1 supported by hooks 2 from the frame 3 of a windshield 4. The frame is so mounted that the curtain will lie against the windshield and will be in the line of vision of the driver of the automobile.

The curtain consists of wires 5 extending transversely of frame 1, and spaced apart about the distance of the wires forming usual fly screening. The vertically positioned supporting and spacing wires are shown at 6. These wires are transversely spaced from one another such a distance as to afford practically no transverse light diffusing means, while providing adequate means for supporting and spacing the wires 5. The wires 6 preferably each consist of three strands 7 arranged alongside one another so as to form a single wire. This wire may be suitably connected to the transverse wires 5 for spacing the latter, and in the present instance I have shown wires 6 connected to wires 5 by weaving the strands 7 of each wire 6 through the wires 5, the adjacent strands of a wire 6 being oppositely woven through the wires 5. It will be apparent however, that wires 6 may be connected to wires 5 by weaving wires 6 as units through the transverse wires for connecting the same in any other suitable manner.

It will be noted that the construction as thus described provides for diffusing of light rays up and down, while eliminating the diffusing of light rays transversely and in alinement with the line of vision of the person looking through the curtain, and as a consequence the light diffused by the curtain will have no blinding tendency.

Various changes may be made without departing from the spirit of the invention as claimed.

What is claimed is:

1. An article of manufacture consisting of a light diffusing device applicable to road vehicles for the purpose of reducing the intensity of light beams in the path of the vehicle and consisting of a sheet of screen-like material composed of fine wire arranged in parallel, horizontal strands spaced about fifty wires to the inch and each wire of about number thirty-four gauge forming therefor narrow horizontal interstices; the wires being supported by vertically extending bars.

2. An article of manufacture consisting of a light diffusing device applicable to road vehicles for the purpose of reducing the intensity of light beams in the path of the vehicle and consisting of a sheet of screen-like material composed of fine wire arranged in parallel, horizontal strands spaced about fifty wires to the inch and each wire of about number thirty-four gauge forming therefor narrow horizontal interstices; the wires being supported by vertically extending bars, said bars being spaced about one-half inch apart and a marginal frame bordering the said screen sheet.

In testimony whereof we have signed our names to this specification.

ANTONIN DUBUC.
A. CARRICABURU.